United States Patent
Chien et al.

(10) Patent No.: US 11,320,922 B1
(45) Date of Patent: May 3, 2022

(54) ELECTRONIC PRODUCT AND TOUCH-SENSING DISPLAY MODULE THEREOF INCLUDING SLOT IN BENDING PORTION OF FILM SENSING STRUCTURE

(71) Applicant: TPK Advanced Solutions Inc., Fujian (CN)

(72) Inventors: Ting Chieh Chien, Zhunan Township, Maoli County (TW); Xingjie Zhang, Sanming (CN); Renyuan Yan, Yongtai County (CN); Zhijuan Lin, Longhai (CN)

(73) Assignee: TPK Advanced Solutions Inc., Xiamen (CN)

( * ) Notice: Subject to any disclaimer, the term of this patent is extended or adjusted under 35 U.S.C. 154(b) by 0 days.

(21) Appl. No.: 17/083,414

(22) Filed: Oct. 29, 2020

(51) Int. Cl.
*G06F 3/041* (2006.01)

(52) U.S. Cl.
CPC .. *G06F 3/0412* (2013.01); *G06F 2203/04102* (2013.01); *G06F 2203/04104* (2013.01)

(58) Field of Classification Search
CPC ......... G06F 3/0412; G06F 2203/04102–04104
See application file for complete search history.

(56) References Cited

U.S. PATENT DOCUMENTS

| | | | |
|---|---|---|---|
| 2017/0242457 A1* | 8/2017 | Lee | G06F 3/0412 |
| 2017/0285844 A1* | 10/2017 | Park | G06F 1/1643 |
| 2020/0103716 A1* | 4/2020 | Guo | G02F 1/13452 |
| 2020/0294428 A1* | 9/2020 | Kim | H04M 1/0266 |
| 2021/0135151 A1* | 5/2021 | Baek | H04M 1/0268 |
| 2021/0263363 A1* | 8/2021 | Horie | G06F 3/0412 |

* cited by examiner

*Primary Examiner* — Liliana Cerullo
(74) *Attorney, Agent, or Firm* — Cooper Legal Group, LLC

(57) ABSTRACT

A touch-sensing display module is provided, including a display unit and a film sensing structure. The display unit has a front surface, a rear surface opposite the front surface, and a side connecting the front surface and the rear surface. The film sensing structure is attached to the display unit and includes a main body and a bending portion connected to the main body, wherein the bending portion includes a slot. The bending portion extends from the front surface of the display unit to the rear surface along the side. The bending portion covers a portion of the side and a portion of the rear surface. A portion of the display unit is exposed by the slot.

20 Claims, 8 Drawing Sheets

ELECTRONIC PRODUCT AND TOUCH-SENSING DISPLAY MODULE THEREOF INCLUDING SLOT IN BENDING PORTION OF FILM SENSING STRUCTURE

BACKGROUND

Field of the Disclosure

The application relates in general to an electronic product and a touch-sensing display module thereof, and in particular to a touch-sensing display module that includes a film sensing structure with a bending portion and a slot.

Description of the Related Art

Thanks to ongoing technological developments, people's pursuit of high-performance and high-standard visual enjoyment of electronic products is getting higher and higher so as to enrich and improve product experience. For example, products such as smartphones, laptop computers, and tablet computers that operate on touch screens have emerged today, enriching people's experience in using electronic products. In the face of people's desire for more powerful, thinner, and more efficient products, the size of the product itself is also approaching miniaturization and versatility, such as narrow bezel, full-screen design, or curved screen design. In view of this, how to provide a device structure that is intuitive to use, miniaturized, or efficiently utilizes space so that the volume of the device can be reduced is an important issue.

BRIEF SUMMARY

To address the deficiencies of conventional products, an embodiment of the disclosure provides a touch-sensing display module, including a display unit and a film sensing structure. The display unit has a front surface, a rear surface opposite the front surface, and a side connecting the front surface and the rear surface. The film sensing structure is attached to the display unit and includes a main body and a bending portion connected to the main body, wherein the bending portion includes a slot. The bending portion extends from the front surface of the display unit to the rear surface along the side, the bending portion covers a portion of the side and a portion of the rear surface, and a portion of the display unit is exposed by the slot.

In some embodiments, the slot exposes a second portion of the rear surface and a second portion of the side of the display unit.

In some embodiments, the main body is adjacent to the front surface, and the bending portion is adjacent to the side and the rear surface.

In some embodiments, the touch-sensing display module further comprises a substrate, wherein the film sensing structure and the display unit are disposed on the substrate, and the film sensing structure is located between the substrate and the display unit.

In some embodiments, the front surface of the display unit faces the substrate.

In some embodiments, the bending portion is disposed on at least one end of the film sensing structure.

In some embodiments, the film sensing structure has an L-shaped profile.

In some embodiments, the bending portion is disposed at two ends of the film sensing structure. The two ends are opposite from each other. The film sensing structure has a C-shaped profile.

In some embodiments, the slot is a through slot penetrating the film sensing structure.

In some embodiments, the touch-sensing display module further comprises a first optical adhesive disposed between the film sensing structure and the display unit, and the display unit is bonded to the film sensing structure through the first optical adhesive.

In some embodiments, the touch-sensing display module further comprises a second optical adhesive disposed between the substrate and the film sensing structure, and the film sensing structure is bonded to the substrate through the second optical adhesive.

An embodiment of the disclosure provides an electronic product that comprises the aforementioned touch-sensing display module and a functional element adjacent to the touch-sensing display module. The slot of the bending portion is set in a position that corresponds to a position of the functional element.

In some embodiments, the touch-sensing display module further includes a light shielding layer disposed on the surface of the substrate to define the peripheral area of the touch-sensing display module.

In some embodiments, the substrate is configured with an optical hole corresponding to the functional element through a clearance or an opening of the light shielding layer.

BRIEF DESCRIPTION OF DRAWINGS

The disclosure can be more fully understood by reading the subsequent detailed description and examples with references made to the accompanying drawings.

DETAILED DESCRIPTION

The making and using of the embodiments of the touch-sensing display module and electrode device are discussed in detail below. It should be appreciated, however, that the embodiments provide many applicable inventive concepts that can be embodied in a wide variety of specific contexts. The specific embodiments discussed are merely illustrative of specific ways to make and use the embodiments and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
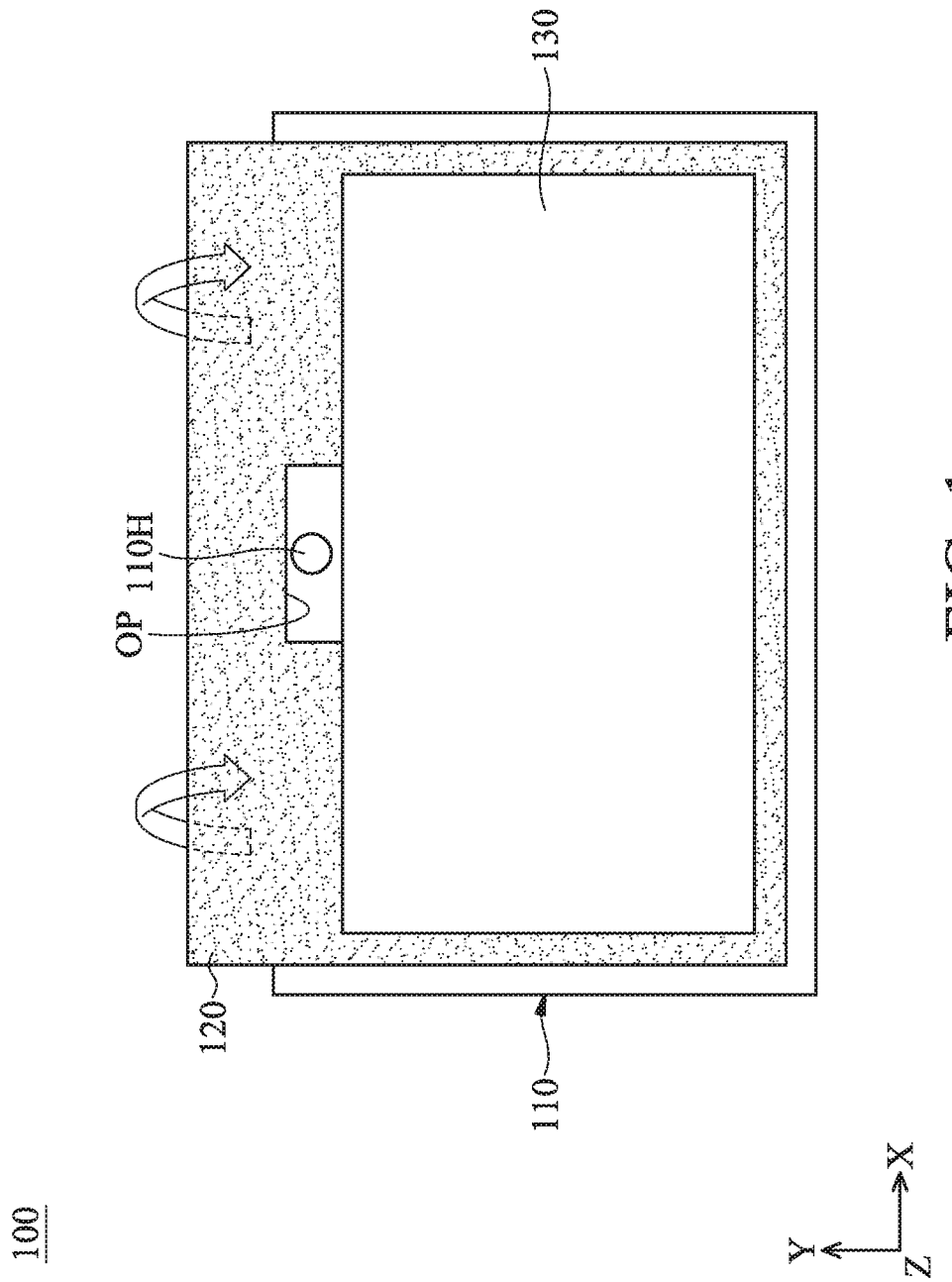
FIG. 1 is a schematic diagram of a touch-sensing display module according to an embodiment of the present disclosure, wherein a film sensing structure of the touch-sensing display module has not yet been bent.
Figure 2A:
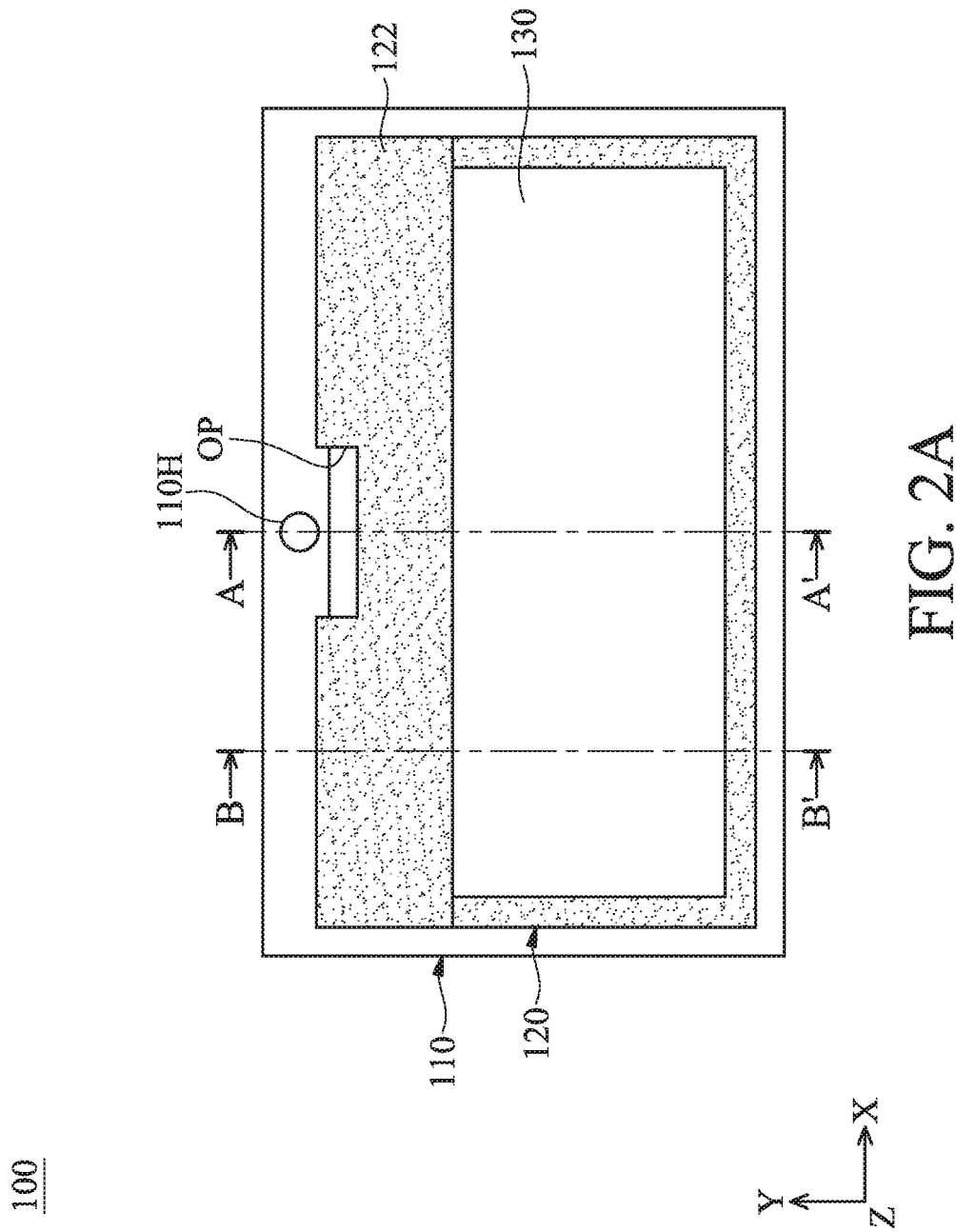
FIG. 2A is a schematic diagram of the film sensing structure of the touch-sensing display module after having been bent.

FIGS. 1 and 2A are schematic diagrams showing a touch-sensing display module 100 according to an embodiment of the disclosure. FIG. 1 shows a state in which a film sensing structure 120 of the touch-sensing display module 100 has not been bent, and FIG. 2A shows a state in which the film sensing structure 120 has been bent. The touch-sensing display module 100 can be applied to electronic products and provides touch-sensing function and display function. The electronic products include, for example, mobile phones, notebook computers, or tablet computers. The user can touch the touch-sensing display module 100 to achieve the function of inputting instructions or operations and watching the image output from the electronic product. In some manufacturing processes of touch-sensing display modules, such as the touch-sensing display module 100, by bending a portion of the film sensing structure 120, a frame of the electronic product can be narrowed or a frameless design can be achieved so that the display surface of the electronic product can be more beautiful and the display area can be increased. The detailed structure of the touch-sensing display module 100 will be described below first, and the manufacturing process of the touch-sensing display module 100 in some embodiments will be detailed later.

Figure 2B:
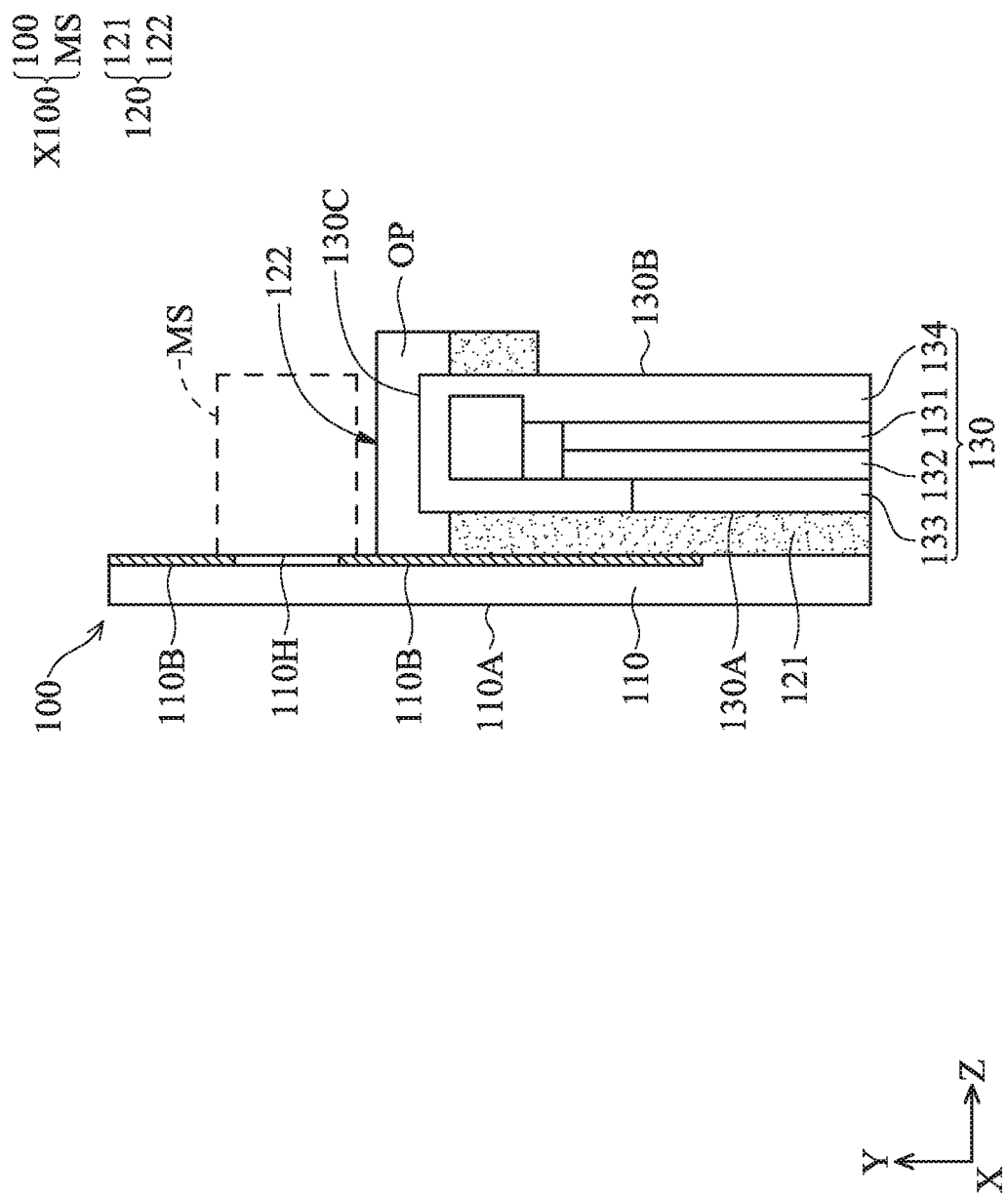
FIG. 2B is a schematic cross-sectional view along the line A-A' in FIG. 2A.
Figure 2C:
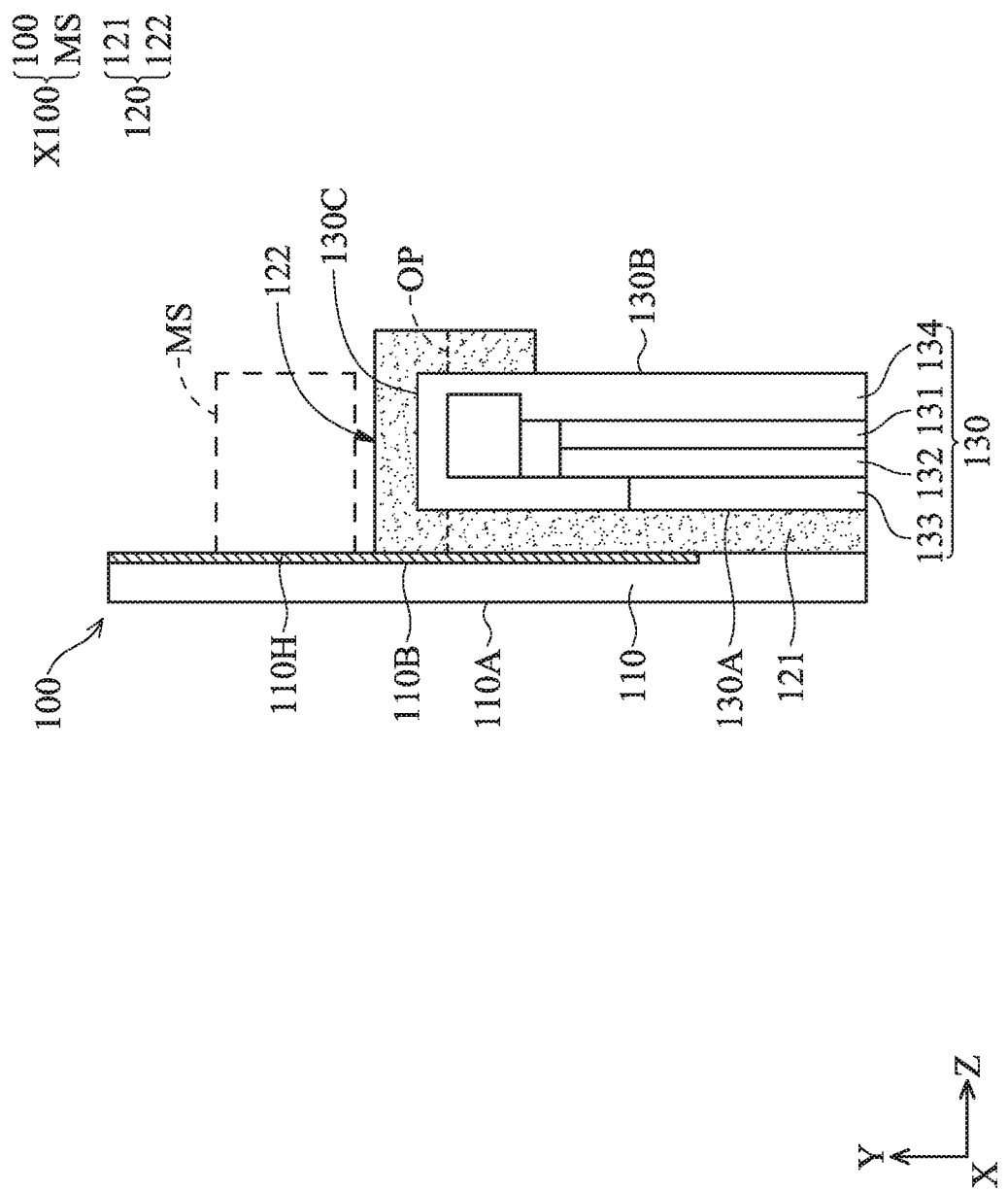
FIG. 2C is a schematic cross-sectional view along the line B-B' in FIG. 2A.

The touch-sensing display module 100 includes a substrate 110, the film sensing structure 120, and a display unit 130. The film sensing structure 120 and the display unit 130 are located on the substrate 110 (in the Z-direction), and the film sensing structure 120 is located between the substrate 110 and the display unit 130. Referring to FIGS. 2A to 2C, the substrate 110 may be a cover glass, which is located on the outermost layer of the touch-sensing display module 100 (i.e., the substrate 110 is the outermost layer of the touch-sensing display module 100), and covers the film sensing structure 120 and the display unit 130 for protection. In some embodiments, the outer surface 110A of the substrate 110 may be a surface for a user to touch and operate. On the other side, the film sensing structure 120 and the display unit 130 are arranged inside the substrate 110. Moreover, in some embodiments, the film sensing structure 120 is a part of an electronic product X100 (FIGS. 2B and 2C). The electronic product X100 also includes a functional element MS, wherein the functional element MS is adjacent to the touch-sensing display module 100 and can be arranged on an inner side of the substrate 110. The functional element MS can be an optical component. For example, the optical component can be a camera lens unit, an optical sensor element, an optical receiving element, etc. The functional element MS can also be an antenna or a structural part, such as a fixing part or a protruding part, but the functional element MS is not limited thereto.

Furthermore, an inner surface of the substrate 110 can be provided with a light shielding layer 110B to define a peripheral area to shield peripheral circuits of the touch-sensing display module 100 and the functional component MS of the electronic product X100. For example, looking at the use of the functional element MS as an optical component, in order to allow the optical component to operate normally, the substrate 110 may be configured with an optical hole 110H that corresponds to the optical component through a clearance or an opening of the light shielding layer 110B to provide an optical channel and to prevent the light shielding layer 110B from blocking the optical component. In some embodiments, in the Y-direction, the optical hole 110H is usually located near an upper edge of the touch-sensing display module 100.

The display unit 130 can be used to display images for the user to watch, and the film sensing structure 120 can enable the touch-sensing display module 100 to have a touch-sensing function. The user can touch the substrate 110 (for example, the user can touch the outer surface 110A using a finger or a stylus) to achieve touch sensing.

The display unit 130 is configured to display images. The display unit 130 can be a liquid-crystal display (LCD), a light-emitting diode (LED) display, or other types of suitable displays. Light-emitting diodes may include organic light-emitting diodes (OLED), submillimeter light-emitting diodes (mini LED), micro light-emitting diodes (micro LED) quantum dot light-emitting diodes (quantum dot LED, QDLED), etc. In this embodiment, a liquid-crystal display is used as an illustration. The display unit 130 has a backlight member 131, a liquid-crystal layer 132, a polarizing member 133, and a display unit frame 134, wherein the backlight member 131, the liquid-crystal layer 132, and the polarizing member 133 are provided in the display unit frame 134. In other embodiments, the display unit 130 may include alignment layers, coating layers, diffusion layers, or brightness enhancement films to make the display unit 130 emit light uniformly or brightly.

Regarding the film sensing structure 120, please continue to refer to FIGS. 2A to 2C. The film sensing structure 120 has a main body 121 and a bending portion 122. The bending portion 122 is connected to at least one side of the main body 121. In the Z-direction, the display unit 130 is sandwiched between the main body 121 and the bending portion 122. In particular, the display unit 130 has a front surface 130A, a rear surface 130B opposite the front surface 130A, and a side 130C connecting the front surface 130A and the rear surface 130B. The main body 121 of the film sensing structure 120 is adjacent to the front surface 130A, and the bending portion 122 of the film sensing structure 120 is adjacent to the side 130C and the rear surface 130B. The bending portion 122 extends from the front surface 130A along the side 130C to the rear surface 130B, and partially covers the side 130C and the rear surface 130B of the display unit 130. In some embodiments, the film sensing structure 120 includes a transparent sensing electrode layer (not shown) and peripheral leads (not shown) electrically connected to the transparent sensing electrode layer, wherein the transparent sensing electrode layer is disposed on an area corresponding to the main body 121, and the peripheral leads are arranged on an area corresponding to the bending portion 122.

It is worth noting that the bending portion 122 of the film sensing structure 120 is provided with a slot OP. In this embodiment, the slot OP is a through slot penetrating the film sensing structure 120 and expos or revealing a portion of the display unit 130. Specifically, the position of the slot OP on the bending portion 122 is designed to correspond to the position of the functional element MS of the electronic product X100. In this way, by arranging the slot OP on the bending portion 122, mechanical interference between the functional element MS of the electronic product X100 and the bending portion 122 can be avoided when the bending portion 122 of the film sensing structure 120 is bent, which can allow for more flexibility in the mechanical layout or subsequent production and assembly processes. In addition, since the peripheral leads of the film sensing structure 120 are arranged at the bending portion 122, after the bending portion 122 is bent and there is a bending angle less than 180° (for example, 90°) between the bending portion 122 and the main body 121, the peripheral leads can be at least partially located on the side 130C of the display unit 130. In this way, the occupied area of the light shielding layer 110B of the substrate 110 can be reduced relative to conventional touch-sensing display modules, which is conducive to the narrowing of the border of the display surface of the electronic product X100 or the design of a full screen without a border.

In addition, the film sensing structure 120 may, for example, include at least a substrate member (not shown) and at least a transparent sensing electrode layer (not shown) disposed on the substrate member. In some embodiments, a laminated structure can be, for example, a transparent sensing electrode layer disposed on at least one surface of a substrate member. In some embodiments, a laminated structure can be, for example, two transparent sensing electrode layers respectively disposed on opposite sides of a substrate member. In some embodiments, a laminated structure can be, for example, two transparent sensing electrode layers respectively disposed on surfaces of different substrate members and then, through an adhesive layer (not shown), the two substrate members can be bonded together where the transparent sensing electrode layers have been formed. It should be noted that the design of the laminated structure of the film sensing structure 120 in the present disclosure is not limited to the above structures.

Figure 3A:
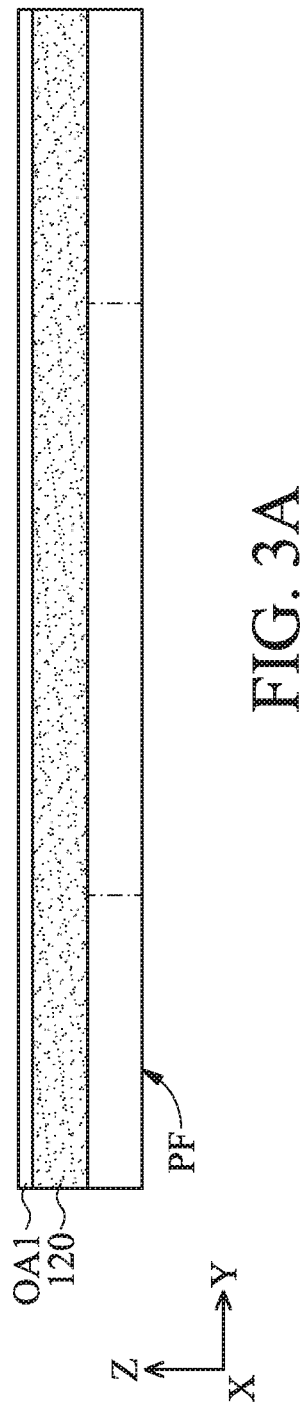
FIGS. 3A to 3E are schematic diagrams showing the manufacturing process of the touch-sensing display module according to an embodiment of the disclosure.

FIGS. 3A to 3E show the manufacturing process of the touch-sensing display module 100 according to an embodiment of the disclosure. It should be noted that this embodiment is used to describe the manufacturing method of the touch-sensing display module 100, and other functional components of the electronic product X100 are omitted. The relationship of the components of the touch-sensing display module 100 and the functional element MS can be referenced in FIGS. 2B and 2C. First, as shown in FIG. 3A, a film sensing structure 120 is disposed on a release mold PF. The release mold PF can be, for example, a release film, which serves as a temporary carrier substrate, and a first optical adhesive OA1 is provided on the film sensing structure 120. In some embodiments, if the film sensing structure 120 includes a substrate member with sufficient support during the manufacturing process, the release mold PF may not be required, the film sensing structure 120 may be provided without the release mold PF during the manufacturing process, and the first optical adhesive OA1 is on the film sensing structure 120.

Figure 3B:
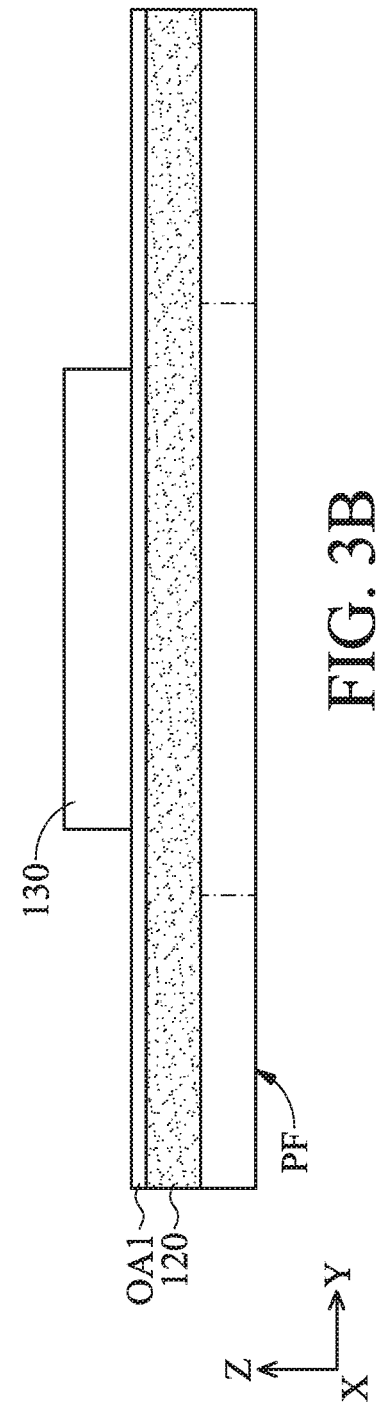
Figure 3C:
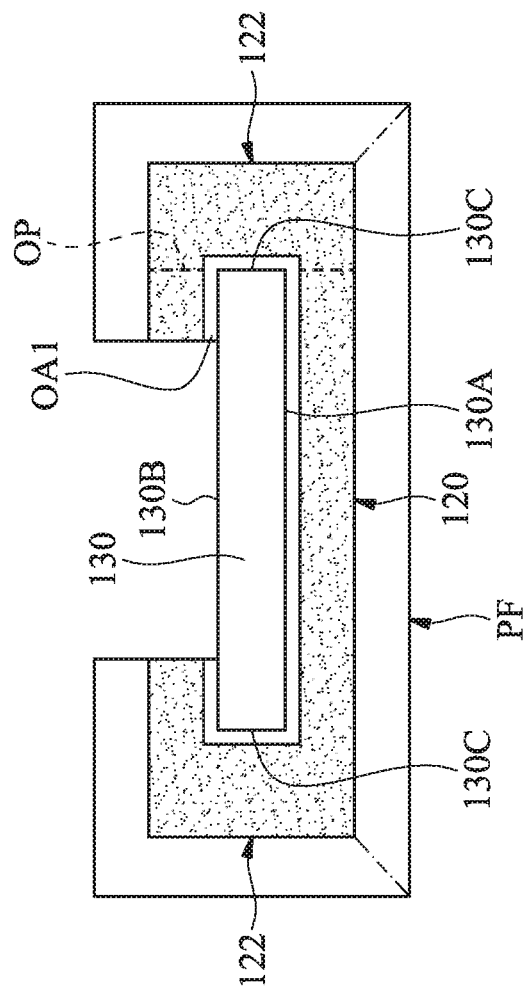

Next, as shown in FIG. 3B, a display unit 130 is disposed on the film sensing structure 120 through the first optical adhesive OA1. Then, a bending process is performed. As shown in FIG. 3C, the film sensing structure 120 and the first optical adhesive OA1 are bent by the release mold PF. In this embodiment, two opposite ends of the film sensing structure 120 with the first optical adhesive OA1 are bent for illustration: That is, both ends of the film sensing structure 120 have bending portions 122. In other words, the two bending portions 122 in this embodiment are connected to opposite sides of the main body 121. During the bending process, the bending portion(s) 122 of the film sensing structure 120 extends from the front surface 130A of the display unit 130 along the side 130C to the rear surface 130B and covers a portion of the side 130C and the rear surface 130B after bending. Viewing from the X-direction, the bending portion 122 is an L-shaped or C-shaped structure. In addition, the bending portion 122 of the film sensing structure 120 can be attached or bonded to the side 130C and the rear surface 130B of the display unit 130 through the first optical adhesive OA1.

Figure 3D:
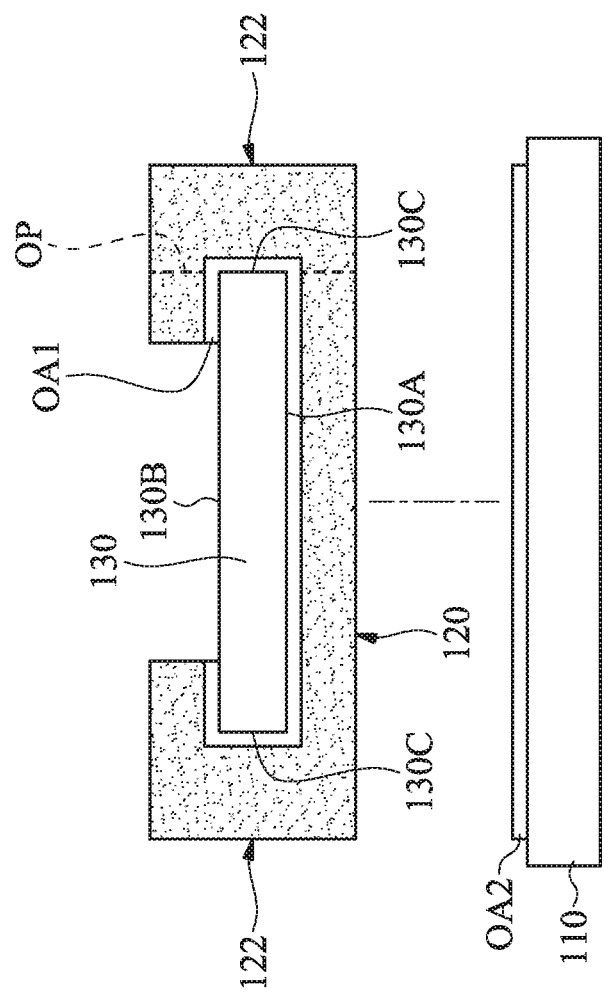
Figure 3E:
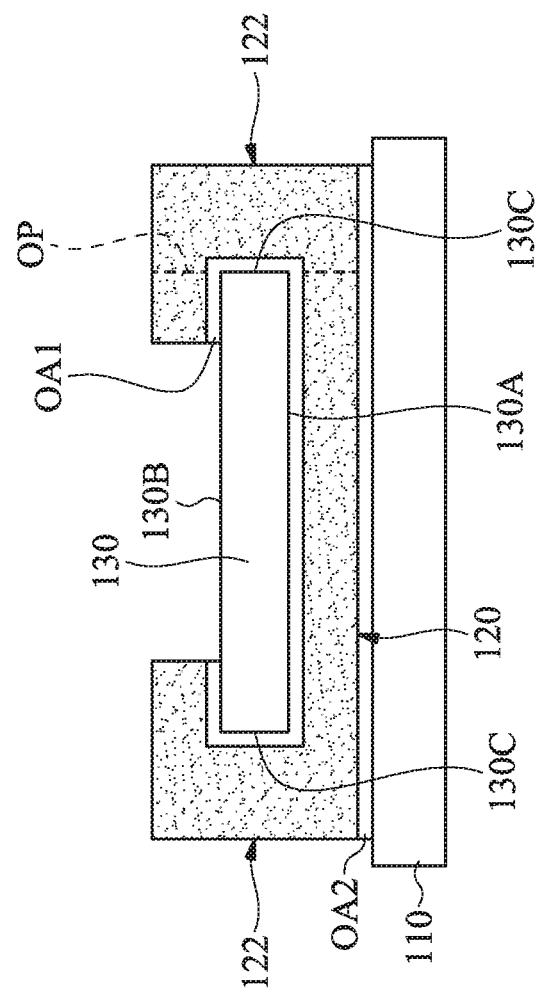

Continuing to refer to FIG. 3D, the release mold PF is separated from the bent film sensing structure 120 (at least partially covering the display unit 130), and the film sensing structure 120 is placed on the substrate 110. The film sensing structure 120 is connected to and disposed on the substrate 110 by a second optical adhesive OA2. In this way, the bent film sensing structure 120 is disposed on the substrate 110, as shown in FIG. 3E. In this embodiment, since the opposite ends of the film sensing structure 120 are bent, the film sensing structure 120 presents a C-shaped profile when viewed from a direction that is perpendicular to the direction in which the substrate 110, the film sensing structure 120, and the display unit 130 are arranged. In other embodiments, at least one end of the film sensing structure 120 has a bending portion 122. That is, the bending portion 122 is connected to one side of the main body 121, as shown in FIG. 2C, so that the film sensing structure 120 has an L-shaped profile.

It is worth noting that the bending portion 122 of the film sensing structure 120 has a slot OP. That is, there is no portion of the film sensing structure 120 at the slot OP so that the functional element MS of the electronic product X100 corresponding to the slot OP can avoid bending interference and assembly interference with the film sensing structure 120. In other words, since the bending portion 122 is formed with the slot OP, the assembly of the film sensing structure 120, the substrate 110, and the functional element MS of the electronic product X100 can be easier. Furthermore, since the structure of the film sensing structure 120 is no longer at the position of the slot OP, a distance between the functional element MS and the film sensing structure 120 can be greatly reduced. That is, there is no need to keep a space between them to prevent interference. Therefore, the problem of interference between components is effectively solved. In addition, the bending portion 122 extends from the front surface 130A to the rear surface 130B of the display unit 130 and covers the side 130C of the display unit 130, which can facilitate adhesion between the film sensing structure 120 and the display unit 130, and the reliability of the electronic product X100 is effectively enhanced.

In summary, an embodiment of the present disclosure provides a touch-sensing display module, including a display unit and a film sensing structure. The display unit has a front surface, a rear surface opposite the front surface, and a side connecting the front surface and the rear surface. The film sensing structure is attached to the display unit and includes a main body and a bending portion connected to the main body, wherein the bending portion includes a slot. The bending portion extends from the front surface of the display unit to the rear surface along the side and covers a portion of the side and a portion of the rear surface, and a portion of the display unit is exposed by the slot.

An embodiment of the present disclosure provides an electronic product including the aforementioned touch-sensing display module and a functional element. The functional element is adjacent to the touch-sensing display module. The position of the slot of the bending portion is set so that the position of the slot corresponds to the position of the functional element.

The present embodiment has at least one of the following advantages or functions. By forming an opening in the bending portion of the film sensing structure, a slot of the bending portion of the film sensing structure can correspond to the outer functional element of the electronic product. This can prevent or greatly reduce interference between the film sensing structure and the functional element. Furthermore, since the peripheral leads of the film sensing structure are arranged at the bending portion, the peripheral leads can be positioned near the side of the display unit due to the bending of the bending portion. As a result, the occupied area of the light shielding layer of the substrate can be relatively reduced, which is helpful for designing electronic products whose display surface has only a narrow border or no borders. In addition, the bending portion is bent toward the rear of the display unit to cover the side and the rear of the display unit. This facilitates the bonding of the film sensing structure and the display unit and improves the quality of the module.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the disclosure. It is intended that the standard and examples be considered as exemplary only, with the true scope of the disclosed embodiments being indicated by the following claims and their equivalents.

What is claimed is:

1. A touch-sensing display module, comprising:
    a display unit having a front surface, a rear surface opposite the front surface, and a side connecting the front surface and the rear surface;
    a film sensing structure attached to the display unit and comprising a main body and a bending portion connected to the main body, wherein the bending portion comprises a slot; and
    a light shielding layer disposed over the bending portion, wherein the bending portion extends from the front surface of the display unit to the rear surface along the side, the bending portion covers a portion of the side and a portion of the rear surface, a portion of the display unit is exposed by the slot, and the bending portion is located between the front surface of the display unit and the light shielding layer.

2. The touch-sensing display module as claimed in claim 1, wherein the slot exposes a second portion of the rear surface and a second portion of the side of the display unit.

3. The touch-sensing display module as claimed in claim 1, wherein the main body is adjacent to the front surface, and the bending portion is adjacent to the side and the rear surface.

4. The touch-sensing display module as claimed in claim 1, further comprising a substrate, wherein the film sensing structure and the display unit are disposed on the substrate, and the film sensing structure is located between the substrate and the display unit.

5. The touch-sensing display module as claimed in claim 4, wherein the front surface of the display unit faces the substrate.

6. The touch-sensing display module as claimed in claim 4, further comprising a second optical adhesive disposed between the substrate and the film sensing structure, and the film sensing structure is bonded to the substrate through the second optical adhesive.

7. The touch-sensing display module as claimed in claim 1, wherein the bending portion is disposed on at least one end of the film sensing structure.

8. The touch-sensing display module as claimed in claim 7, wherein the film sensing structure has an L-shaped profile.

9. The touch-sensing display module as claimed in claim 1, wherein the bending portion is disposed at two ends of the film sensing structure which are opposite each other, and the film sensing structure has a C-shaped profile.

10. The touch-sensing display module as claimed in claim 1, wherein the slot is a through slot penetrating the film sensing structure.

11. The touch-sensing display module as claimed in claim 1, further comprising a first optical adhesive disposed between the film sensing structure and the display unit, and the display unit is bonded to the film sensing structure through the first optical adhesive.

12. An electronic product, comprising:
    the touch-sensing display module as claimed in claim 1; and
    a functional element adjacent to the touch-sensing display module,
    wherein the slot of the bending portion is set in a position that corresponds to a position of the functional element.

13. The electronic product as claimed in claim 12, wherein the touch-sensing display module further comprises a substrate, and the light shielding layer is disposed on a surface of the substrate to define a peripheral area of the touch-sensing display module.

14. The electronic product as claimed in claim 13, wherein the substrate is configured with an optical hole corresponding to the functional element through a clearance or an opening of the light shielding layer.

15. The electronic product as claimed in claim 13, wherein the film sensing structure and the display unit are disposed on the substrate, and the film sensing structure is located between the substrate and the display unit.

16. The electronic product as claimed in claim 15, wherein the front surface of the display unit faces the substrate.

17. The electronic product as claimed in claim 12, wherein the slot exposes a second portion of the rear surface and a second portion of the side of the display unit.

18. The electronic product as claimed in claim 12, wherein the main body is adjacent to the front surface, and the bending portion is adjacent to the side and the rear surface.

19. The electronic product as claimed in claim 12, wherein the bending portion is disposed on at least one end of the film sensing structure.

20. The electronic product as claimed in claim 12, wherein the slot is a through slot penetrating the film sensing structure.

* * * * *